United States Patent [19]
Town

[11] Patent Number: 6,002,521
[45] Date of Patent: Dec. 14, 1999

[54] LIGHT DISPERSIVE INSULATED GLAZING UNIT

[75] Inventor: Michael Hayden Town, Santa Rosa, Calif.

[73] Assignee: Thinking Lightly, Inc., Santa Rosa, Calif.

[21] Appl. No.: 08/747,804

[22] Filed: Nov. 14, 1996

[51] Int. Cl.[6] ............................... G02B 5/18; E06B 3/24
[52] U.S. Cl. ................... 359/566; 428/34; 359/1
[58] Field of Search .................. 359/1, 13, 14, 359/15, 615, 599, 566, 567, 591, 592, 593; 428/34, 430, 69

[56] References Cited

U.S. PATENT DOCUMENTS

| | | | |
|---|---|---|---|
| 4,335,166 | 6/1982 | Lizardo et al. | 428/34 |
| 4,337,990 | 7/1982 | Fan et al. | 350/1.7 |
| 4,716,506 | 12/1987 | Shang | 359/567 |
| 4,721,349 | 1/1988 | Fan et al. | 350/1.7 |
| 4,799,745 | 1/1989 | Meyer et al. | 350/1.7 |
| 4,842,389 | 6/1989 | Wood et al. | 359/14 |
| 4,853,264 | 8/1989 | Vincent et al. | 428/34 |
| 4,968,138 | 11/1990 | Scott et al. | 359/1 |
| 4,975,307 | 12/1990 | Sollogoub | 428/34 |
| 5,039,352 | 8/1991 | Mueller et al. | 359/592 |
| 5,048,925 | 9/1991 | Gerritsen et al. | 359/566 |
| 5,066,525 | 11/1991 | Nakamachi et al. | 359/13 |
| 5,071,206 | 12/1991 | Hood et al. | 359/360 |
| 5,306,547 | 4/1994 | Hood et al. | 428/213 |

OTHER PUBLICATIONS

1996 Product Guide for High Performance Glazing—International Version (Southwall Technologies) (Jul. 1995).

*Primary Examiner*—Jon W. Henry
*Attorney, Agent, or Firm*—Lyon & Lyon LLP

[57] ABSTRACT

Light dispersive insulated glazing units are disclosed. The light dispersive insulated glazing units comprise two lites of glazing material, spaced apart from and opposing one another and a visible light dispersive film, such as a hologram or diffraction grating, interposed between confronting surfaces of the lites. Methods for producing these light dispersive insulated glazing units are disclosed, as well.

33 Claims, 5 Drawing Sheets

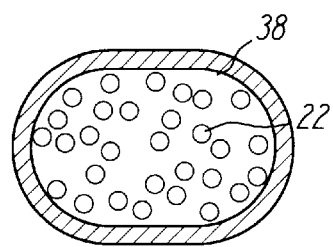
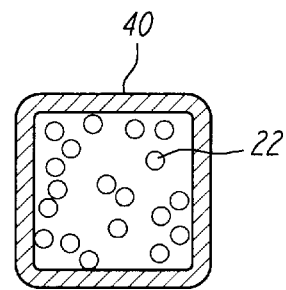
*FIG. 7*   *FIG. 8*
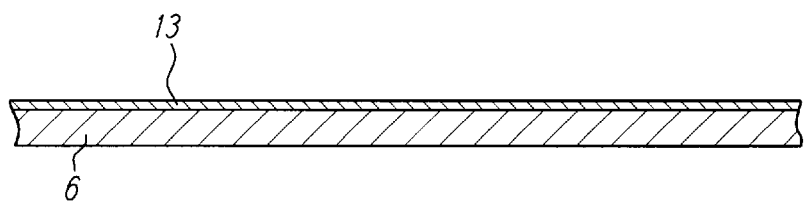
*FIG. 9*
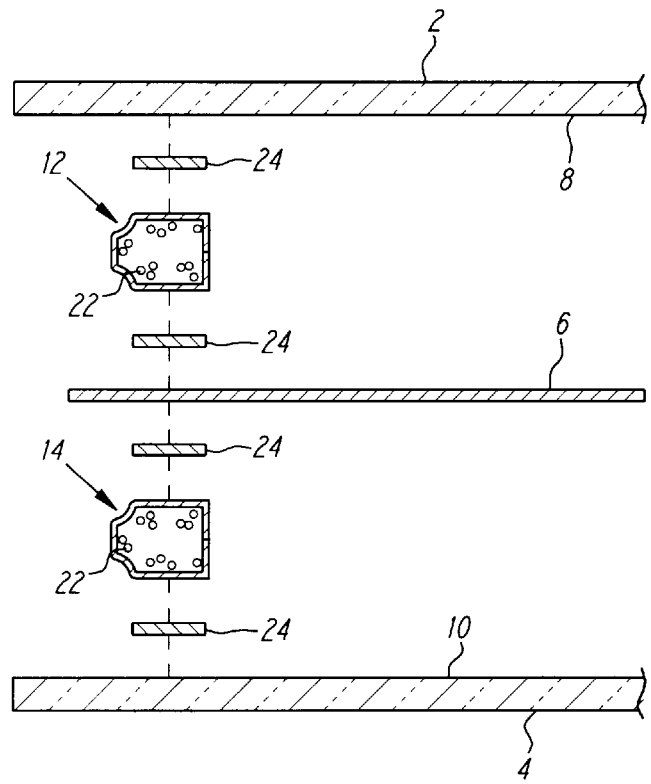
*FIG. 10*

6,002,521

LIGHT DISPERSIVE INSULATED GLAZING UNIT

BACKGROUND OF THE INVENTION

1. Field of the Invention

The invention relates to multiple-lite insulated glazing units. More particularly, the invention relates to multiple-lite insulated glazing units containing a light dispersive film, such as a film having a hologram, diffraction grating or light refracting pattern thereon.

2. Description of the Prior Art

Over the last two decades, there has been an increased emphasis on the use of multiple-lite insulated glazing units in architectural design. One of the primary motivations behind this increased emphasis has been the advent of numerous governmental regulations which mandate the installation of such constructions due to their high energy efficiency. At the same time, rising energy prices have made the high cost of such multiple-lite glazing units, when compared to conventional single-lite glazing units, a prudent long-term investment.

The conventional multiple-lite insulated glazing unit has traditionally employed two or more lites of glass, the faces of which were in a parallel, spaced relationship. This spaced relationship provided one or more dead air spaces between the lites which, in turn, imparted insulating properties to the structure. In the most common arrangement, two parallel lites of glass were held in a spaced relationship by a metallic or plastic standard glazing frame positioned around the perimeter of the lites. When a triple-lite glazing unit was desired for more energy efficiency, one common approach was to use three parallel lites of glass. However, this structure can be extremely heavy.

In an attempt to reduce this weight detriment, while at the same time maintaining the improved energy efficiency of the triple-lite construction, a triple-lite glazing unit was developed which employed two glass lites and an intermediate plastic film interposed between the glazing lites in a parallel, spaced relationship as described in U.S. Pat. No. 4,335,166 and U.S. Pat. No. 4,853,264, both of which are incorporated herein by reference. In a further attempt to exploit the energy efficiency of such a unit, it has been suggested to coat the intermediate plastic film with a material, such as metal, which is highly reflective of long wave infrared radiation. These coatings are typically referred to as heat reflective coatings.

In no instance has the intermediate plastic film been used to disperse visible light into its constituent frequencies by diffraction and/or refraction, nor has a holographic pattern been incorporated into the intermediate plastic film. In fact, one of the prime objectives of these prior art insulated glazing units has been to prevent dispersion of visible light, light dispersion being generally considered deleterious to the desired function of the device.

If architectural designers or artists desired to disperse visible light by diffraction or refraction in connection with an insulated glazing unit, it was known by those skilled in the art that a transparent film etched with a holographic pattern or containing a diffraction grating could be laminated to one of the outer surfaces of the glazing lites. However, as such a construction was generally considered unsatisfactory, there has been a tendency to stay away from the application of light dispersive films to insulated glazing units. This construction was generally considered inadequate due to the recognized potential for bubbling, warping, and peeling of the film, which would result from the failure of the film to adhere to the lites after repeated thermal expansion and contraction cycles and exposure of the film to moisture. The above construction was also avoided due to the knowledge that prolonged exposure of the polyester film, which is typically used in the construction of transparent holographic films and diffraction gratings, to UV light would cause the film to become brittle and peel or crack. The exposed polyester film would also be susceptible to being marred and scratched, thereby degrading the holographic image or diffraction grating contained on the film. Accordingly, a need exists for an insulated glazing unit capable of dispersing light, but which eliminates or reduces the foregoing problems.

SUMMARY OF THE INVENTION

It is the general object of the present invention to provide a light dispersive insulated glazing unit having a light dispersive film, such as a film having a hologram, diffraction grating, or light refracting pattern thereon, interposed between two spaced lites of glazing material.

The light dispersive film employed in the present invention has a light dispersive pattern such as an imaging hologram, non-imaging hologram, or diffraction grating thereon, and thus light dispersive insulated glazing units according to the present invention provide a desirable visual effect when impinged with a beam of light from the sun or an artificial source. Specifically, the glazing units of the present invention separate the impinging beam of sunlight or artificial light into colors by diffraction and/or refraction with the concomitant formation of one or more spectrum. The glazing units of the present invention can also provide the enhanced energy efficiency and sound control associated with multi-lite insulated glazing units.

In a preferred embodiment of the present invention, a light dispersive insulated glazing unit is provided, comprising a support structure; a first glazing lite attached to the support structure; a second glazing lite attached to the support structure so that the second glazing lite is opposing the first glazing lite and is spaced apart from the first glazing lite; and a light dispersive film interposed between, and spaced apart from the opposing surfaces of the first glazing lite and the second glazing lite. In addition, at least a portion of the perimeter of the light dispersive film is attached to the support structure to hold the light dispersive film in suspension between, and spaced apart from, the first glazing lite and the second glazing lite.

As the light dispersive film is suspended between the glazing lites in the present embodiment, concern with the film bubbling or peeling from the outer lite surface is completely eliminated. Embrittlement of the light dispersive film from UV exposure is also minimized, and the light dispersive film is not susceptible to being scratched during routine cleaning of the unit or from environmental forces such as wind, rain, hail, dust, and the like. Further, as the resulting unit will have a dead air space between each of the lites and the film, the light dispersive insulated glazing unit will have energy efficiencies comparable to a conventional triple-lite glazing unit.

In an alternative preferred embodiment of the present invention, a light dispersive insulated glazing unit is provided, comprising a support structure; a first glazing lite attached to the support structure; a second glazing lite attached to the support structure so that the second glazing lite is opposing the first glazing lite and is spaced apart from the first glazing lite; and a light dispersive film laminated to the opposing surface of the first or second glazing lite so that the light dispersive film is interposed between the first and second glazing lites.

Even though the light dispersive film is laminated to the glazing lite in the present embodiment, because it is interposed between the glazing lites of the glazing unit, rather than being laminated to an outer surface of the glazing lites, improved resistance to bubbling and peeling of the film is achieved. Also, the potential for UV damage to the film is reduced and the hologram or diffraction grating on the film will not become marred or scratched during routine cleaning of the insulated glazing unit or from environmental forces, such as wind, rain, hail, dust and the like. As a result, the light dispersive insulated glazing units of the present embodiment have increased life expectancies. Further, the glazing unit will exhibit energy efficiencies comparable to conventional double-lite glazing units.

Applications for the light dispersive insulated glazing units of the present invention are varied and include, but are not limited to, interior or exterior glazing for any type of new or existing building or architectural structure, privacy screens for buildings, three-dimensional art works, such as sculptures, two-dimensional art works, multi-media art works, or any other art work or architectural application where glazing is used.

In another aspect of the present invention, a method for fabricating light dispersive insulated glazing units is provided. According to this method a substantially sealed integral unit comprising a pair of spaced glazing lites and a heat-shrinkable light dispersive film interposed between the glazing lites and spaced apart from the glazing lites is formed, the light dispersive film being fixed along at least two of its edges with respect to the edges of the glazing lites. The assembled structure is then subjected to a heat treatment for a time and at a temperature sufficient to heat shrink the light dispersive film and cause it to become taut and wrinkle-free.

Other novel features that are characteristic of the invention, as to organization and method of manufacture, together with further objects and advantages thereof will be better understood from the following description considered in connection with the accompanying drawings in which the embodiments of the present invention are illustrated by way of example. It is to be expressly understood, however, that the drawings are for the purpose of illustration and description only and are not intended as limitations on the invention.

BRIEF DESCRIPTION OF THE DRAWINGS

FIG. 7 is a cross-sectional view of an alternative spacer design suitable for the present invention;

FIG. 8 is a cross-sectional view of another alternative spacer design suitable for the present invention;

FIG. 9 is a cross-sectional view through a light dispersive film according to a preferred embodiment of the present invention;

FIG. 10 is an exploded view of the junction among the two glazing lites and light dispersive film according to another embodiment of the present invention.

DESCRIPTION OF THE PREFERRED EMBODIMENTS

Figure 1:
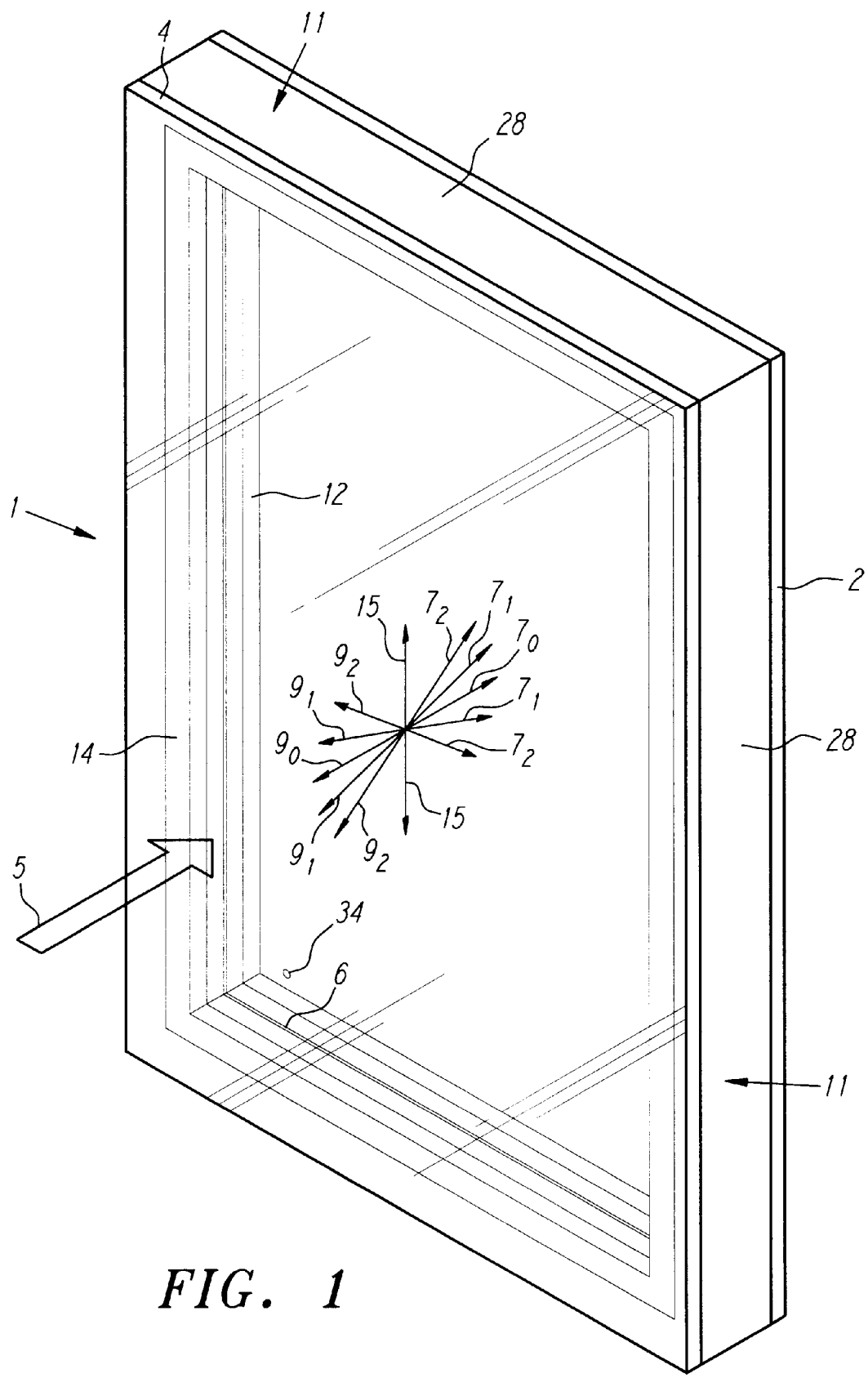
FIG. 1 is a perspective view of a light dispersive insulated glazing unit according to an embodiment of the present invention.

A preferred embodiment of the present invention is now described in connection with FIGS. 1 and 2. FIG. 1 shows a perspective view of a completed light dispersive insulated glazing unit 1 according to the present invention. Whereas, FIG. 2 is a perspective view thereof shown in partial cross-section.

While the shape of the insulated glazing unit 1 according to the present embodiment is illustrated as being rectangular, the shape is not so limited. The shape of the light dispersive insulated glazing unit 1 according to the present invention will depend on the specific architectural or art work application in which it is to be employed. Typically, however, the light dispersive insulated glazing unit will be rectangular or square. But as one skilled in the art will immediately recognize virtually any shape can be employed, including triangles, circles, round-tops, and trapezoids. In addition, the present invention may be utilized in connection with the curved triple-pane glazing unit described and claimed in U.S. Pat. No. 4,853,264, which has been incorporated herein by reference above.

Figure 2:
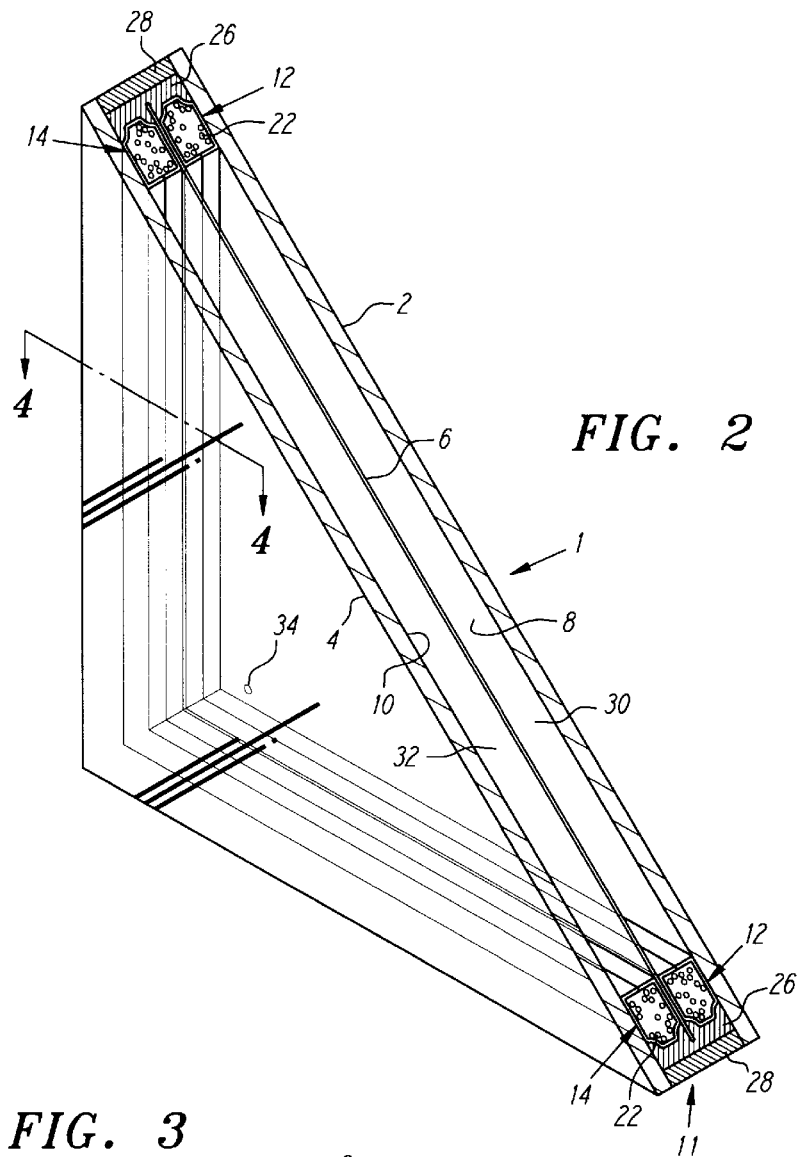
FIG. 2 is a perspective view, shown in partial cross-section, of the light dispersive insulated glazing unit of FIG. 1.

Referring to FIGS. 1 and 2, the completed light dispersive insulated glazing unit 1 of the preferred embodiment comprises a first glazing lite 2 and a second glazing lite 4, which are spaced apart from one another, and a light dispersive film 6, which is interposed between opposing surfaces 8 and 10 of each lite 2 and 4. Support structure 11, is attached to the entire periphery of opposing surfaces 8, 10 of lites 2 and 4 to hold the lites in a spaced relationship. In addition, at least a portion of the perimeter of the light dispersive film 6 is attached to the support structure 11 to firmly hold the light dispersive film 6 in suspension between and spaced apart from the first glazing lite 2 and second glazing lite 4.

Figure 4:
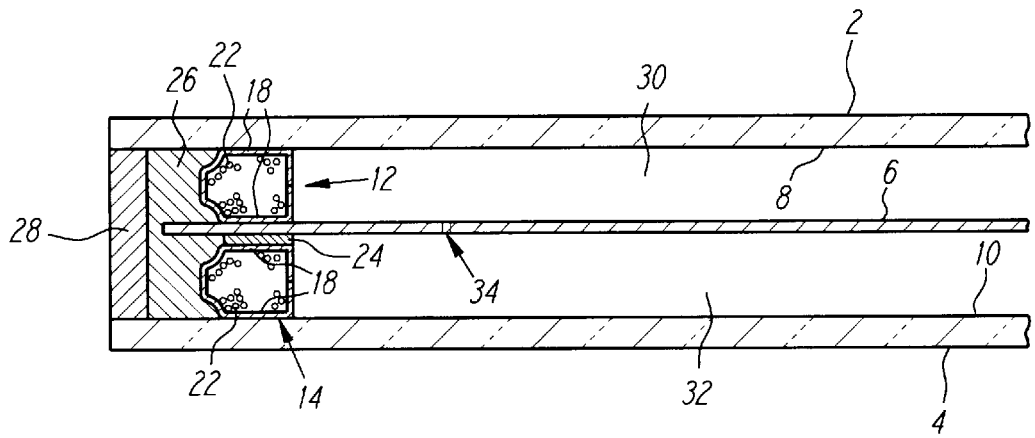
FIG. 4 is a cross-sectional view taken along line 4—4 in FIG. 2 and shows elements of the light dispersive insulated glazing unit of the present invention as assembled after heating.
Figure 5:
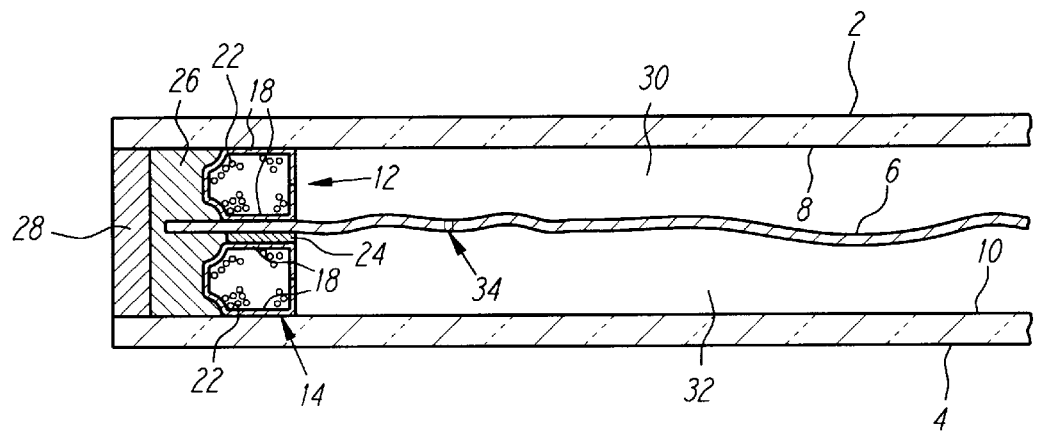
FIG. 5 is a cross-sectional view similar to that of FIG. 4 but showing elements of the light dispersive insulated glazing unit of the present invention prior to heating.

As more clearly shown in FIGS. 4 and 5, support structure 11 is comprised of two spacers 12 and 14 extending generally about the periphery of their respective lites 2 and 4, an adhesive material 24, a first sealant 26 and a second sealant 28. In the present embodiment, spacers 12 and 14 are of identical dimensions in cross-section so that light dispersive film 6 is preferably positioned midway between the opposing surfaces 8, 10 of lites 2 and 4. Preferably, as illustrated in FIGS. 1 and 2, spacers 12 and 14 are shaped such that when the lites 2 and 4 are attached to the spacers 12 and 14, the lites are parallel to each other and to the film 6.

The glazing lites 2 and 4 can be fabricated from any of the materials well-known in the art, such as glass, polycarbonate, acrylic, glass reinforced polyester, or tempered glass. Laminated glass can also be used. Tempered glass is preferred because of its longevity and safety. Any conventional thickness of glazing lite may be used, although ¼ and ⁵⁄₁₆ inch thick lites are preferred, as these are typically used in the construction of light dispersive insulated glazing units and are readily available.

The thickness of glazing lites 2 and 4 do not need to be the same. For example, the outer glazing lite—that is the glazing lite which is struck first by the impinging beam of sunlight or artificial light 5 which is to be dispersed by the light dispersive film 6—could be a ¼ inch tempered glass lite, while the inner lite could be a ⁵⁄₁₆ inch tempered laminate. In the case of flat insulating glazing units, except for thickness, it is preferable that glazing lites 2 and 4 be of the same shape and size. In the case of curved glazing units, such as disclosed in U.S. Pat. No. 4,853,264, the outer lite will have a slightly larger radius than the inner lite, as would be readily apparent to those skilled in the art.

Figure 6:
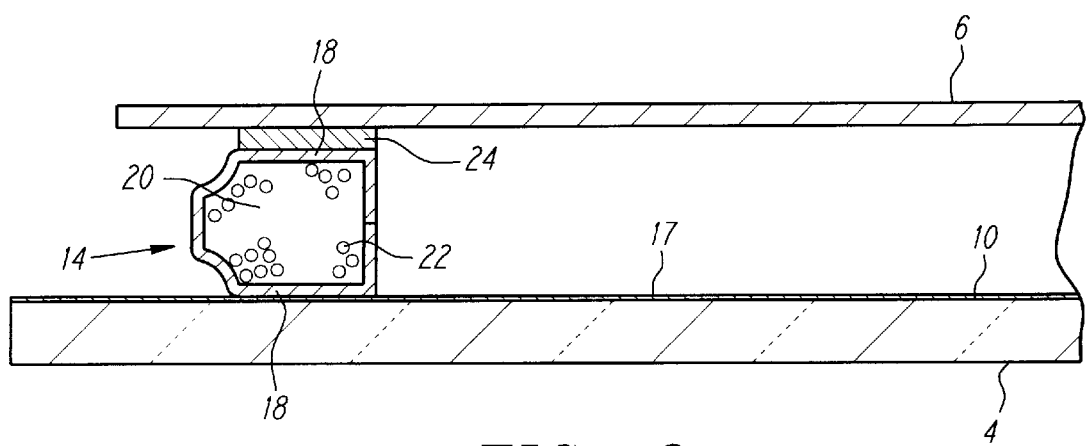
FIG. 6 is an enlarged view of the circled portion of FIG. 3.

As one skilled in the art will immediately recognize, one or both of the glazing lites 2 and 4 may be coated, tinted, or pigmented. This is typically done to enhance appearance, to alter light-transmission properties, or to promote heat rejection. A low emissivity coating 17, such as metal, is illustrated in FIG. 6 as being applied to the inner surface 10 of lite 4. Low emissivity coatings are well known in the art and need not be described in further detail.

Light dispersive film 6 has a light dispersive pattern thereon that separates an impinging beam of sunlight or natural light into two or more of its constituent frequencies by diffraction and/or refraction and thereby produces one or more spectrum of colors to the observer when positioned at an appropriate viewing angle. A variety of light dispersive patterns, such as imaging holograms, non-imaging holograms, and diffraction gratings can be formed on film 6 using techniques well known in the art such as printing or etching. Typically, the light dispersive pattern will be formed on film 6 by a photochemical printing process, a holographic etching process, or a mechanical etching process, such as embossing. However, other techniques can be used to produce light dispersive film 6 without deviating from the spirit of the present invention. In addition, light dispersive film 6 can be clear, translucent, opaque, or partially or fully reflective. Preferably, however, the film is clear or translucent and etched with a diffraction grating.

In the present embodiment, light dispersive film 6 is clear or translucent and is etched with a unidirectional diffraction grating or hologram in the horizontal direction. As can be seen from the illustration in FIG. 1, a number of spectrums are produced from the dispersion of an impinging beam of light 5 on film 6. These spectrums are transmitted through the light dispersive insulated glazing unit 1 to form spectrums $7_1$ and $7_2$, reflected back from the light dispersive insulated glazing unit 1 to form spectrums $9_1$ and $9_2$, and diffracted over the surface of the film 6 to form spectrums 15 in the film itself.

Spectrums $7_1$ represent the first order spectrums formed from the dispersion of light beam 5 as it passes through light dispersive film 6 and spectrums $7_2$ represent the second order spectrums formed from the dispersion of light beam 5. Similarly, spectrums $9_1$ represent the first order spectrums which will form from the dispersion of light beam 5 as it is reflected by light dispersive film 6 and spectrums $9_2$ represent the second order spectrums which will form from the dispersion of light beam 5 as it is reflected by light dispersive film 6.

Rays $7_0$ and $9_0$, on the other hand, represent the principal or central image that is formed when light beam 5 passes through film 6 or is reflected from film 6. Principal or central images $7_0$ and $9_0$ represent nondispersed light. Each pair of spectra $7_1$, $7_2$, $9_1$, and $9_2$ are equally spaced on opposite sides of their respective principal images. Further, as the etched lines of the hologram run in the horizontal direction, the light is dispersed in the vertical direction to form the various spectra pairs.

The amount of light from light beam 5 transmitted, reflected, or surface diffracted will depend on the number of lines per millimeter or embossed on the film, the amplitude of the lines, and the angle of incidence of the impinging beam of light 5.

Patterns having between about 400 to 2,000 etched lines per millimeter tend to properly disperse the impinging visible light and produce a desirable visual effect. The exact number and amplitude of the etched lines on film 6 will depend on the intended visual effect and application.

For example, as one skilled in the art of holography will recognize, as the line spacing decreases (or frequency of lines per millimeter increases), the greater the diffraction angle at which the first and second order spectrums will be formed. Further, the spectrums that are formed will tend to be wider or more spread out as the line spacing decreases (or frequency of lines per millimeter increases). Thus, more spectrums will be observed with films having lower frequency line spacings (or greater spacing between the etched lines), because the diffraction angle at which the first, second, and higher order spectrums are formed will be smaller and the spectrum will not be as spread out.

When a high intensity white light beam, such as sunlight, passes directly through a light dispersive film 6 having line spacings within the above range, one or more pleasing multicolored spectral array or "rainbow" are projected into the interior of the room. As the angle of incident light becomes more acute, however, the amount of spectral light projected through the film will decrease and the amount of surface diffraction will increase, causing the film itself to display an array of colors, the appearance of which will change depending on the viewing angle.

A light dispersive insulated glazing unit 1 employing a film 6 having line spacings of approximately 400 to 1,000 lines per millimeter range would typically be used in applications where an unfettered view through the glazing unit is not desired or expected. Films within the 400 to 1,000 lines per millimeter range have a relatively low spatial frequency of dispersion and are in layman's terms "dusty" in appearance, due to their increased surface noise and multiple propagating orders. Such films tend to obscure the view of the objects on the opposite side of the film more than would be experienced with a film having a higher spacial frequency of dispersion. Insulated glazing units 1 employing such films are particularly well suited for applications such as skylights and art sculptures due to their need for high intensity white light to create the desired visual effect.

Films having between approximately 1,000 and 2,000 lines per millimeter etched thereon tend to be fairly transparent, resulting in little obscuring of the objects viewed through the film. However, films having 2,000 lines per millimeter will be more transparent than films having 1,000 lines per millimeter. Films having between 1,600 and 2,000 lines per millimeter etched on them are particularly clear. As a result, these films can be advantageously employed in light dispersive insulated glazing units 1 that are intended to permit occupants of a building to see through the glazing unit without obscuring the objects viewed.

Less surface diffraction also tends to occur with films having a high spatial frequency of etched lines due to the fact that the etched lines are typically of smaller amplitude. As a result, the observed surface diffraction will tend to appear fainter than that with films having lower spacial frequencies, such as the 400 lines per millimeter film. As one skilled in the art will recognize, however, the efficiency of light transmission through film 6 is dependent upon the amplitude of the etched lines and will be greatest when the etched lines are at the optimum amplitude for a given line spacing.

Instead of having a uniform line spacing over the entire film, film 6 can be etched with a pattern having different line spacings etched thereon in different areas to create a desired visual effect. In addition, film 6 can also be etched with a bi-directional pattern, instead of the unidirectional pattern described above. Typically, the second set of lines are etched at ninety degrees to the first set of etched lines for bidirectional films. As one skilled in the art would recognize, this will cause a second set of spectra to be formed at ninety degree angles to the first set of spectra.

Preferably, light dispersive film 6 is manufactured from a heat-shrinkable polyester. Spectratek Corporation, located at 5405 Jandy Place, Los Angeles, Calif., is a well-known commercial supplier of suitable polyester holographic films. In particular, Spectratek sells a number of suitable non-imaging holograms under the trademarks CROSSTAR (bi-directional 400 lines/mm), SPECTRASHEEN (bi-directional 1,000 lines/mm), and HOLOSHEEN (unidirectional 1600 lines/mm). Two thousand lines/mm light dispersive films 6 have been obtained from Wavefront located at 15149 Garfield Ave, Paramount, Calif. 90723. In addition, Wavefront has produced films embossed with patterns having different line orientations in different regions under the trademarks GATOR GRATING and PATCHES. Both of these films are articulated holograms in that they contain an articulated holographic pattern comprised of different regions having line orientations that are articulated to one another.

Opaque, partially and fully reflective films can be used to reflect the dispersed light from light beam 5. Opaque light dispersive films can be obtained by etching the diffraction grating hologram on an opaque film surface on the side of the film facing light beam 5. Whereas, reflective light dispersive films can be obtained by applying a layer of metal to light dispersive film 6 using well known techniques in the art.

Light dispersive film 6 is preferably at least 3 mils (0.003 inches) thick. Thinner films are usable, but may produce undesired sagging and deformation after prolonged use due to cyclical heating and cooling resulting from repeated exposures to the sun.

FIG. 9 shows a light dispersive film 6 having a heat or light rejecting layer 13 applied thereto such as a layer of metal or a dielectric metal interference filter to reflect long wave infrared radiation. As layer 13 becomes thicker, more light will be reflected and less will be transmitted through glazing unit 1.

It is often desirable to include ultra-violet light absorbers in the light dispersive film 6 to increase its resistance to becoming brittle upon prolonged exposure to sunlight. In addition, to the extent possible, ultra-violet transparent materials should be avoided for the exterior lite 4. The use of a glass or other lite material that inhibits the transmission of UV rays, as the exterior lite 4, will increase the life expectancy of the glazing unit 1.

Spacers 12 and 14 are positioned near the peripheral edges of the opposing lite surfaces 8, 10 and support the lites in their spaced relationship with the light dispersive film 6 and each other. Spacers 12 and 14 are attached to the surface of their respective lites by first and second sealant 26 and 28 and extend generally about the entire periphery of the lite. At these edges, spacers 12 and 14 and first and second sealant 26 and 28 serve to join the lites 2 and 4. Spacers 12 and 14 along with first sealant 26 also serve to grip and adhere the light dispersive film 6 which extends between and slightly beyond the spacers.

Adhesive 24, which is preferably a contact adhesive such as double sided tape, is used to hold the light dispersive film 6 to spacer 14 during construction. However, this can be accomplished using other techniques known in the art, in which case adhesive 24 can be omitted.

Spacers 12 and 14 are well known in the art, and are commonly employed in the manufacture of triple glazing units. Typical spacer materials are plastic extrudates and steel and aluminum extruded and roll-formed channels having a generally tubular shape 20. When viewed in cross-section, the spacers preferably have walls so formed as to provide a substantially hollow interior and flattened parallel exterior wall portions 18. However, spacers having solid cross-sections can also be employed. The hollow portion of the tubular shape 20 preferably contains a desiccant 22 such as silica gel. Spacers 12 and 14 extend about the entire periphery of both lites 12 and 14. The hollow interiors of the tubular shapes are employed in a known fashion to receive corner keys (not shown) at corners of the lites to permit the spacers to be assembled into large open frames generally matching the shape of the lites to be joined.

Spacers 12 and 14 can be of any cross-sectional shape. Spacers 12 and 14 merely illustrate a preferred shape. Other tubular shapes which can be employed for spacer 12 and 14 are illustrated in FIGS. 7 and 8. For example, FIG. 7 illustrates a spacer 38 having a hollow distorted circular shape and FIG. 8 illustrates a spacer 40 having a hollow square shape as just two additional examples of the types of spacers that can be employed in the present invention. Other shapes will be immediately apparent to those skilled in the art.

Tubular shapes of the type described, corner keys, and desiccants are all known in the art and need not be described in further detail.

Spacers 12 and 14 are preferably spaced inwardly slightly from the edge of the lites, as best illustrated in FIGS. 4 and 5 to form a slight depression or trough for the first sealant 26 and second sealant 28. First sealant 26 should have good adhesion to all of the materials of construction. For example, the first sealant will typically need to exhibit good adhesion to the metal or plastic spacers 12 and 14, glass lites 2 and 4, and a polyester light dispersive film 6, which may in some instances be metallized. Further, the adhesive should not outgas excessively during curing as such outgassing may contaminate the inner surfaces of lites 2,4 and the surfaces of film 6, resulting in undesirable visual aberrations. Materials suitable for the first sealant include polyisobutylene, silicone resins, and two-component polyurethane adhesives. Once cured, first sealant 26 strongly adheres together the glass panes, the outwardly exposed portion of the spacers, and the edges of the light dispersive film to form an integral unit. While the entire perimeter of the light dispersive film 6 does not need to come in contact with the first sealant 26, a sufficient portion of the perimeter should contact the sealant so as to keep the film tautly suspended between the lites. For example, film 6 may be attached to support structure 11 on only two opposing sides.

Second sealant 28 is used to seal the unit from moisture in the environment and thus should exhibit good moisture resistance and good adhesion qualities to lite surfaces 8 and 10. Second sealant 28 should also be compatible with and adhere well to the first sealant 26. Adhesive materials suitable for second sealant 28 include silicone resins and two-component polyurethane adhesives. The second sealant 28 can be omitted, and the first sealant used to fill the entire depression or trough formed by lites 2 and 4 and spacers 12 and 14 if the sealant exhibits sufficient adhesive qualities to the materials of construction and, in addition provides adequate moisture resistance. Such sealants are well known in the art and include silicone resins, such as the two-part room temperature-curing resin identified as GE3204 (manufactured by the General Electric Company), and polyurethane adhesives, such as the two-component polyurethane adhesives marketed by Bostik.

If light dispersive insulated glazing unit 1 is designed to be air tight, then preferably means are provided to enable the dead air space 30 between lite 2 and film 6 to communicate with the dead air space 32 created between lite 4 and film 6. Such means may take the form of one or more small perforations formed in film 6 adjacent its edges. One such perforation is shown as 34 in FIGS. 1 and 2. Preferably, these perforations are adjacent to the edge of the portion of the film that is visible to minimize its visibility and its impact on the desired effect created by the light dispersive film 6. Such a perforation equalizes the pressure between dead air spaces 30 and 32 and thereby prevents bowing of film 6. Desirably, only a single perforation 34 is employed, such perforation having smooth edges so as to reduce any tendency of the perforation to initiate a tear in the plastic sheet while the unit is heated to stretch the film or during subsequent thermal cycling caused by repeated exposure to the sun.

As known in the art, dead air spaces 30 and 32 can be filled with an inert gas to improve performance of the unit. Alternatively, the interior spaces can be vented to the atmosphere, if desired.

An alternative embodiment of a light dispersive insulated glazing unit 1 according to the present invention is now described in connection with FIG. 10. FIG. 10 is an exploded view of the junction between the two glazing lites 2 and 4 and light dispersive film 6 according to the present embodiment.

As illustrated in the exploded view of FIG. 10, an adhesive 24, which is preferably a contact adhesive such as double sided tape is interposed between spacer 12, 14 and their respective lites 2, 4. In addition, adhesive 24, is also interposed between each of the spacers and light dispersive film 6. The use of a contact adhesive 24, between each of the sandwiched components of the glazing unit is helpful in temporarily holding the various sandwiched components in proper position relative to one another during fabrication. As illustrated in FIGS. 4 and 5, and described above, the resulting depression or trough formed by the opposing surfaces 8, 10 of the glazing lites that extend beyond the spacers and the outer surface of the spacers is filled with sealants 26 and 28 or, in the alternative, with a single sealant 26.

The remaining features, advantages, and construction of the present embodiment are the same as that described above in connection with FIGS. 1–9 and thus need not be described in further detail here.

The light dispersive insulated glazing unit 1 of the present invention can be produced by sandwiching together the various components. These components include the two glazing lites, the support structure, and the visible light dispersive film. After the various components are assembled, the perimeter of the assembled unit, between adjacent edges of the lites, can be sealed with one or more sealants to provide an encased unit.

Figure 3:
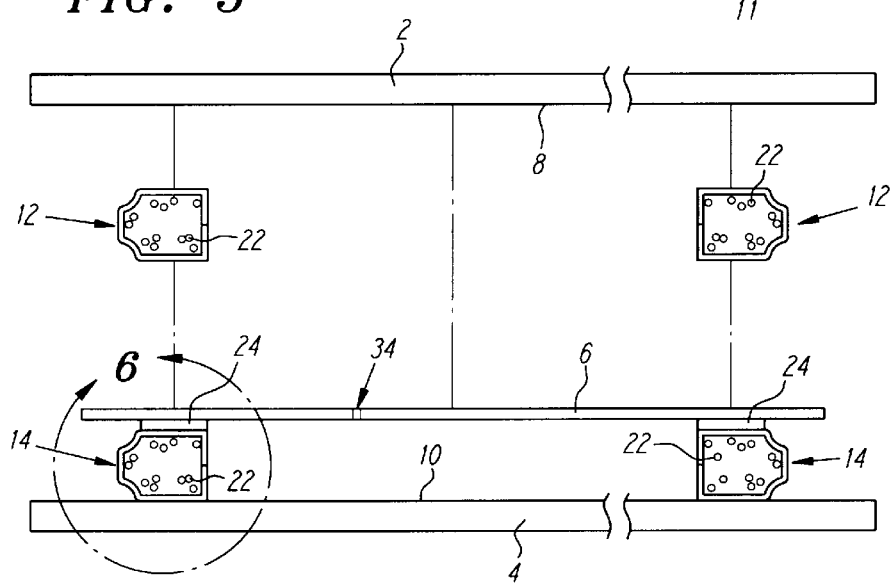
FIG. 3 is an exploded cross-sectional view showing elements of a light dispersive insulated glazing unit of the present invention ready for assembly.

In one preferred mode of production, the units are assembled by cutting the two glazing lites 2 and 4 to the desired dimensions. Then, as best illustrated in FIG. 3, spacer 14 is placed on opposing surface 10 of lite 4. As described above, spacer 14 extends generally about the periphery of the lite and is spaced inward slightly from the lite edge, as shown best in FIG. 6. An adhesive 24, preferably a contact adhesive such as two-sided tape, is placed on the flattened exterior wall portion 18 of the spacer opposite the lite. A heat-shrinkable, light dispersive film 6 is drawn across spacer 14 and is pulled as taut as may be practical so that the film 6 comes into contact with adhesive 24 carried by spacer 14 as shown in FIG. 3. Spacer 12 and lite 2 are then oriented with respect to spacer 14 and lite 4 so that the film is captured between the opposing flattened exterior wall portions 18 of spacers 12 and 14. The film, being somewhat flexible, ordinarily contains waves and wrinkles at this stage, as shown diagrammatically and in exaggerated form in FIG. 5.

Prior to orienting the second spacer and lite with respect to the first spacer and lite, perforation 34 can be formed in film 6 with the aid of a hot cylindrical object such as a needle.

A first sealant 26 is then applied between the adjacent edges of the glazing lites which extend beyond the spacers, such edges forming, with the outer surface of the spacers, a slight depression or trough in the edge of the assembled unit. A sufficient portion of the perimeter of the visible light dispersive film 6, as shown in FIG. 3, should extend into the depression so that it is tautly held in suspension between the lites 2 and 4 by the spacers 12 and 14 and first sealant 26. For example, film 6 may be attached to support structure 11 on only two opposing sides as known in the art. Preferably, however, the entire perimeter of the light dispersive film 6 is sandwiched between spacers 12 and 14 and comes in contact with the first sealant 26.

The first sealant strongly adheres together the glazing lites, the outwardly exposed portions of the spacers, and the edges of the film. The sealant is applied until the spacers and film are completely encased. Preferably, the first sealant is polyisobutylene. A second sealant 28, preferably a silicone resin, is then applied in the remaining portion of the same depression or trough between the edges of the glazing lites until being substantially level with the edges of the lites, thus forming an encased unit which is substantially a hermetically sealed unit so as to prevent moisture from entering the unit and depositing on the light dispersive film or opposing surfaces of the lites.

Preferably the first sealant is allowed to fully cure prior to the application of the second sealant. After both sealants are allowed to cure, the encased unit may then be heated for a period and at an intensity sufficient to cause the heat-shrinkable light dispersive film 6 to shrink to the extent necessary to remove substantially all wrinkles or waves in the film, the film being fixed on at least two opposing sides, and preferably on all sides, by the spacers and the sealant. The encased unit is then cooled slowly. Alternatively, if heat-curable sealants are used, the sealants are typically allowed to first pre-cure and then the light dispersive insulated window unit 1 is subjected to a heat treatment for a time and at an intensity sufficient to both cure the sealants and heat shrink film 6 to a taut condition.

As would be apparent to one skilled in the art, the alternative embodiment of the light dispersive insulated glazing unit 1 illustrated in FIG. 10, can be fabricated using the method described above, with the modification that adhesive 24 is added to each side of the spacers 12 and 14 prior to sandwiching the various components of the light dispersive insulated glazing unit together.

Figure 11:
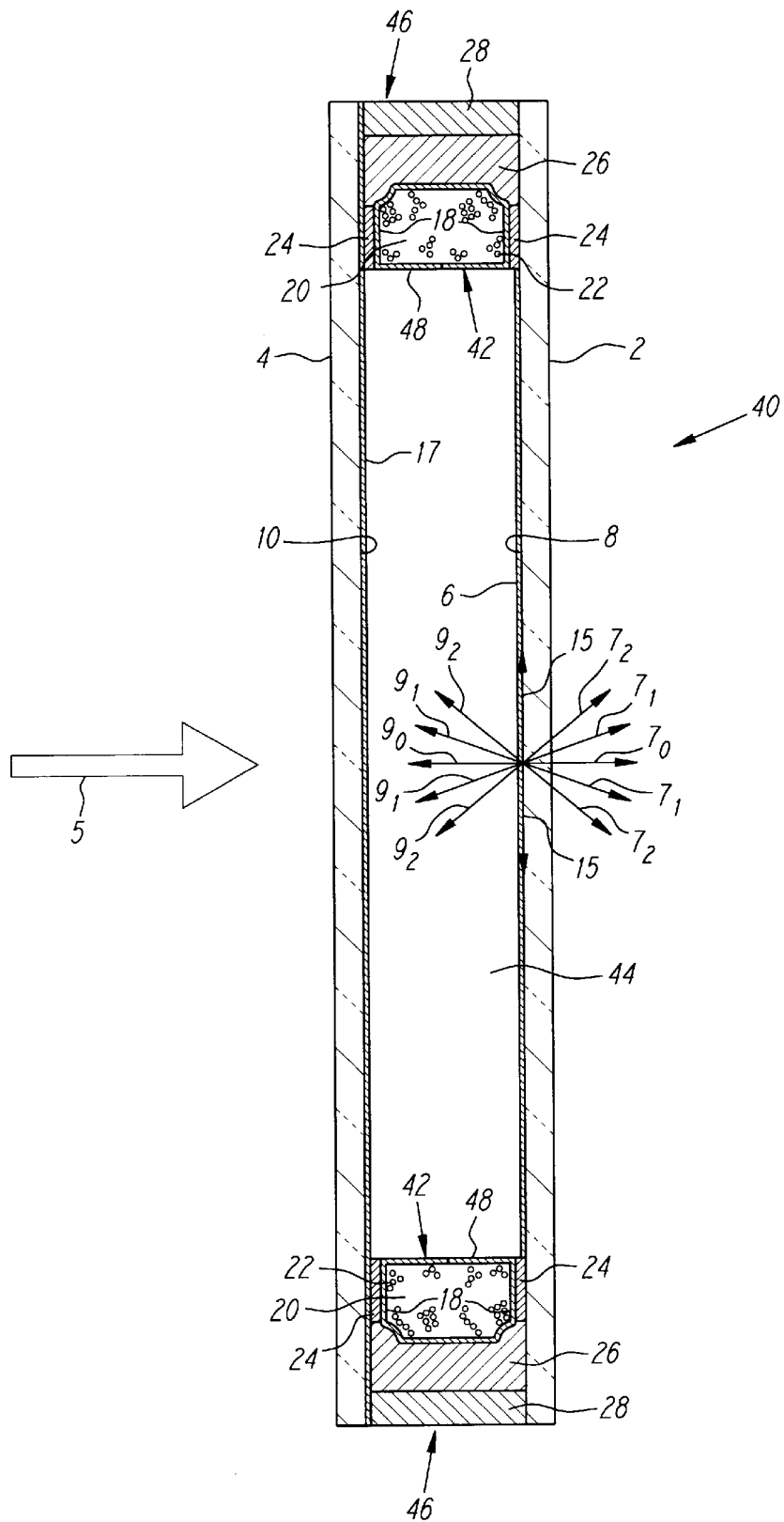
FIG. 11 is a cross-sectional view through a light dispersive insulated glazing unit according to an alternative embodiment of the present invention.

Referring now to FIG. 11, a third embodiment of the present invention is described. FIG. 11 shows a cross-sectional view through a rectangular or square light dispersive insulated glazing unit 40. While unit 40 of the present embodiment is rectangular or square, the overall shape of light dispersive insulated glazing unit 40 will depend on the specific architectural or art work application in which it is to be employed. Typically such applications will require glazing unit 40 to be rectangular or square, but as one skilled in the art will immediately recognize virtually any shape can be employed, including triangles, circles, round-tops, and trapezoids. In addition, the insulated glazing unit 40 of the present embodiment may be utilized in connection with curved glazing units.

Light dispersive insulated glazing unit 40 is comprised of a first glazing lite 2 and a second glazing lite 4, which are spaced apart from and opposing one another, and a light dispersive film 6, which is interposed between opposing surfaces 8 and 10 of each lite 2 and 4. In the present embodiment, light dispersive film 6 is preferably laminated to the opposing surface 8 of lite 2, which in the present embodiment is the inner lite of the glazing unit. Surface 8 of lite 2 is preferred in the present embodiment so that a low emissivity coating 17 can be applied to surface 10 of lite 4 if desired. However, light dispersive film 6 can alternatively be laminated to the opposing surface 10 of lite 4, the outer lite of the glazing unit in the present embodiment.

Support structure 46, is attached to the entire periphery of opposing surfaces 8, 10 of lites 2 and 4 to hold the lites in a spaced relationship. Dead air space 44 is desirably created by the opposing surfaces 8, 10 of lites 2 and 4 and support structure 46.

Support structure 46 is comprised of a spacer 42 extending generally about the periphery of lites 2 and 4, an adhesive material 24, which is interposed between the spacer and each of the opposing lite surfaces 8, 10, a first sealant 26 and a second sealant 28. Preferably spacer 46 is shaped such that the lites are parallel to each other in the sandwiched structure.

The description and considerations expressed above in connection with glazing lites 2, 4, light dispersive film 6, adhesive 24, first sealant 26, and second sealant 28, are equally applicable to the present embodiment and are, therefore, not repeated here. However, with respect to light dispersive film 6, it should be noted that the thickness of the film is not as critical in the present embodiment in view of the fact that the film is laminated to one of the opposing surfaces of the glazing lites. Thus, sagging and deformation of the film after prolonged, repeated exposure to the sun is not as great a concern. Further, as the film 6 is not suspended in the glazing unit, it does not need to extend beyond the inner surface 48 of spacer 42. Indeed, light dispersive film 6 is preferably cut so as to fill the area of opposing surface 10 framed by spacer 42. Finally, as there is only one dead air space 44 and film 6 is laminated to opposing surface 10 of lite 4, there is no need to include a perforation 34 in film 6.

Spacer 42 is positioned near the peripheral edges of the opposing lite surfaces 8, 10 and supports the lites in their spaced relationship with each other. Spacer 42 is attached to the opposing surfaces 8, 10 of lites 2 and 4 by first and second sealant 26 and 28 and extends generally about the entire periphery of the lites. At these edges, spacer 42 and first and second sealant 26 and 28 serve to join the lites 2 and 4.

Adhesive 24, which is preferably a contact adhesive such as double sided tape, is used to hold spacer 42 to opposing surfaces 8, 10 of lites 2 and 4 during construction. However, this can be accomplished using other techniques known in the art, in which case adhesive 24 can be omitted.

Spacer 42 is well known in the art, and are commonly employed in the manufacture of double glazing units. Typical spacer materials are plastic extrudates and steel and aluminum extruded and roll-formed channels having a generally tubular shape 20. When viewed in cross-section, spacer 42 preferably has walls so formed as to provide a substantially hollow interior and flattened parallel exterior wall portions 18. However, a spacer 42 having a solid cross-sections can also be employed. The hollow portion of the tubular shape 20 preferably contains a desiccant 22 such as silica gel. Spacer 42 extends about the entire periphery of both lites 12 and 14. The hollow interiors of the tubular shapes are employed in a known fashion to receive corner keys (not shown) at corners of the lites to permit spacer 42 to be assembled into a large open frame generally matching the shape of the lites to be joined.

Spacer 42 can be of any cross-sectional shape. Spacer 42 merely illustrates a preferred shape. Other tubular shapes which can be employed for spacer 42 include hollow distorted circular spacer 38 illustrated in FIG. 7 and the hollow square spacer 40 illustrated in FIG. 8. Other shapes will be immediately apparent to those skilled in the art.

Tubular shapes of the type described, corner keys, and desiccants are all known in the art and need not be described in further detail.

Spacer 42 is preferably spaced inwardly slightly from the edge of the lites to form a slight depression or trough for the first sealant 26 and second sealant 28.

Various modifications to the preferred embodiments described above will now be evident to those skilled in the art. For example, the assembly may employ more than two lites of glazing material, and more than one light dispersive film. Moreover, any number of coatings which absorb or reflect ultraviolet radiation, such as metal, can be applied to the visible light dispersive film and/or glazing lites in order to prevent premature aging of the film, to provide a desired aesthetic effect, or change the transmission qualities of the light dispersive insulated glazing unit.

While the invention has been described with reference being made to certain preferred embodiments, it will be appreciated that the invention can be modified in many ways, as will be apparent to those of skill in the art without departing from the spirit of the invention, which is as defined by the following claims.

What is claimed is:

1. A light dispersive insulated glazing unit comprising:
   (a) a support structure;
   (b) a first glazing lite attached to said support structure;
   (c) a second glazing lite attached to said support structure so that said second glazing lite is opposing said first glazing lite and is spaced apart from said first glazing lite; and
   (d) a flexible light dispersive film interposed between said first glazing lite and said second glazing lite, wherein said flexible light dispersive film is tautly suspended between and spaced apart from the opposing surfaces of said first glazing lite and said second glazing lite.

2. A light dispersive insulated glazing unit according to claim 1, wherein said light dispersive film is spaced midway between said first glazing lite and said second glazing lite.

3. A light dispersive insulated glazing unit according to claim 1, wherein said light dispersive film is etched or printed with a light dispersing pattern selected from the group consisting of an imaging hologram, non-imaging hologram, and diffraction grating.

4. A light dispersive insulated glazing unit comprising:
   (a) a support structure;
   (b) a first glazing lite attached to said support structure;
   (c) a second glazing lite attached to said support structure so that said second glazing lite is opposing said first glazing lite and is spaced apart from said first glazing lite; and
   (d) a flexible light dispersive film interposed between, and spaced apart from, the opposing surfaces of said first glazing lite and said second glazing lite, at least a portion of the perimeter of said light dispersive film being attached to said support structure to hold said light dispersive film in taut suspension between, and spaced apart from, said first glazing lite and said second glazing lite.

5. A light dispersive insulated glazing unit according to claim 4, wherein the entire perimeter of said light dispersive film is attached to said support structure.

6. A light dispersive insulated glazing unit according to claim 4, wherein said first glazing lite is parallel to said second glazing lite.

7. A light dispersive insulated glazing unit according to claim 4, wherein said light dispersive film is substantially parallel to said first glazing lite and said second glazing lite.

8. A light dispersive insulated glazing unit according to claim 4, wherein said light dispersive film is spaced midway between opposing surfaces of said first glazing lite and said second glazing lite.

9. A light dispersive insulated glazing unit according to claim 4, wherein said light dispersive film is heat-shrinkable.

10. A light dispersive insulated glazing unit according to claim 4, wherein said light dispersive film is polyester.

11. A light dispersive insulated glazing unit according to claim 4, wherein said light dispersive film is at least 3 mm thick.

12. A light dispersive insulated glazing unit according to claim 4, wherein said light dispersive film is etched or printed with a light dispersing pattern selected from the group consisting of an imaging hologram, non-imaging hologram, and diffraction grating.

13. A light dispersive insulated glazing unit according to claim 4, wherein said light dispersive film has a light transmitting quality selected from the group consisting of transparent and translucent.

14. A light dispersive insulated glazing unit according to claim 4, wherein said first glazing lite and said second glazing lite are made from a material selected from the group consisting of glass, laminated glass, tempered glass, acrylic, and polycarbonate.

15. A light dispersive insulated glazing unit according to claim 1 or 4, wherein said light dispersive film has a perforation.

16. A light dispersive insulated glazing unit according to claim 1 or 4, wherein said light dispersive film has a light transmitting quality selected from the group consisting of partially reflective and fully reflective.

17. A light dispersive insulated glazing unit according to claim 1 or 4, wherein said light dispersive film is opaque.

18. A light dispersive insulated glazing unit according to claim 1 or 4, wherein said light dispersive film contains at least one non-focusing unidirectional diffraction grating having a line spacing of at least 400 lines/mm.

19. A light dispersive insulated glazing unit according to claim 18, wherein said light dispersive film contains a plurality of articulated non-focusing unidirectional diffraction gratings having a line spacing of at least 400 lines/mm.

20. A light dispersive insulated glazing unit according to claim 1 or 4, wherein said light dispersive film contains at least one non-focusing bidirectional diffraction gratings having a line spacing of at least 400 lines/mm.

21. A light dispersive insulated glazing unit according to claim 20, wherein said light dispersive film contains a plurality of articulated non-focusing bidirectional diffraction gratings having a line spacing of at least 400 lines/mm.

22. A light dispersive insulated glazing unit according to claim 1, wherein said light dispersive film has a light transmitting quality selected from the group consisting of transparent and translucent.

23. A light dispersive insulated glazing unit comprising:
   (a) a support structure;
   (b) a first glazing lite attached to said support structure;
   (c) a second glazing lite attached to said support structure so that said second glazing lite is opposing said first glazing lite and is spaced apart from said first glazing lite; and
   (d) a flexible light dispersive film interposed between said first glazing lite and said second glazing lite, wherein said flexible light dispersive film is tautly suspended between and spaced apart from the opposing surfaces of said first glazing lite and said second glazing lite, and wherein said light dispersive film contains at least one diffraction grating having a line spacing of at least 400 lines/mm.

24. A light dispersive insulated glazing unit according to claim 23, wherein said light dispersive film has a perforation.

25. A light dispersive insulated glazing unit according to claim 23, wherein said light dispersive film has a light transmitting quality selected from the group consisting of transparent and translucent.

26. A light dispersive insulated glazing unit according to claim 23, wherein said light dispersive film has a light transmitting quality selected from the group consisting of partially reflective and fully reflective.

27. A light dispersive insulated glazing unit according to claim 23, wherein said light dispersive film is opaque.

28. A light dispersive insulated glazing unit according to claim 23, wherein said light dispersive film contains at least one diffraction grating having a line spacing of at least 1,000 lines/mm.

29. A light dispersive insulated glazing unit according to claim 23, wherein said light dispersive film contains at least one diffraction grating having a line spacing of at least 1,600 lines/mm.

30. A light dispersive insulated glazing unit comprising:
   (a) a support structure;
   (b) a first glazing lite attached to said support structure;
   (c) a second glazing lite attached to said support structure so that said second glazing lite is opposing said first glazing lite and is spaced apart from said first glazing lite; and
   (d) a flexible light dispersive film interposed between, and spaced apart from, the opposing surfaces of said first glazing lite and said second glazing lite, at least a portion of the perimeter of said light dispersive film being attached to said support structure to hold said light dispersive film in taut suspension between, and spaced apart from, said first glazing lite and said second glazing lite, wherein said light dispersive film contains at least one diffraction grating having a line spacing of at least 400 lines/mm.

31. A light dispersive insulated glazing unit according to claim 30, wherein said light dispersive film has a perforation.

32. A light dispersive insulated glazing unit according to claim 30, wherein said light dispersive film has a light transmitting quality selected from the group consisting of transparent and translucent.

33. A light dispersive insulated glazing unit according to claim 30, wherein said light dispersive film contains at least one diffraction grating having a line spacing of at least 1,000 lines/mm.

* * * * *

UNITED STATES PATENT AND TRADEMARK OFFICE
CERTIFICATE OF CORRECTION

PATENT NO.     : 6,002,521
DATED          : December 14, 1999
INVENTOR(S)    : Michael Hayden Town It is certified that error appears in the above-identified patent and that said Letters Patent is hereby corrected as shown below:

Column 6,
Line 10, after "millimeter", insert -- etched --.

Signed and Sealed this

Thirtieth Day of October, 2001

*Attest:*

NICHOLAS P. GODICI
*Attesting Officer*   *Acting Director of the United States Patent and Trademark Office*